Aug. 9, 1938. J. A. ROSEMAN 2,126,139
BED KNIFE ADJUSTMENT FOR MOWING MACHINES
Filed Feb. 18, 1937
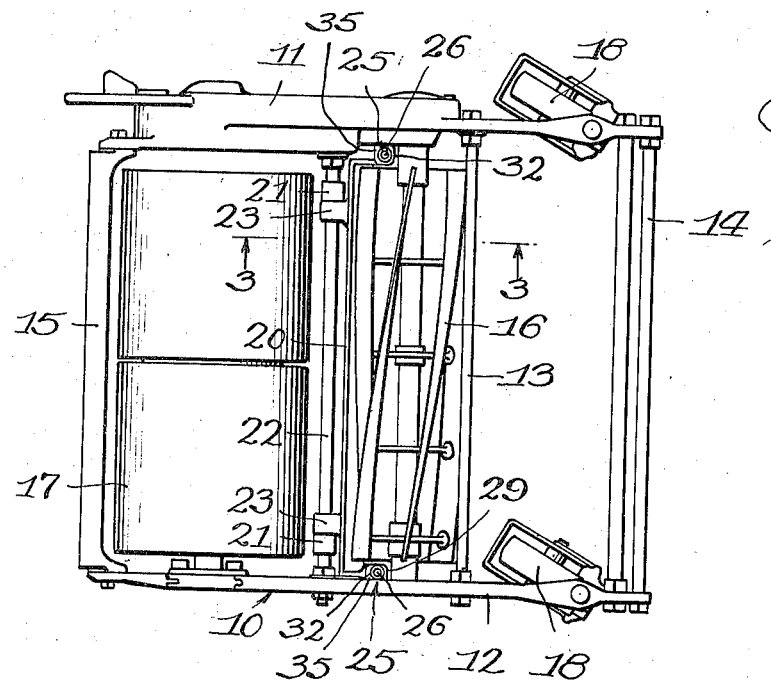
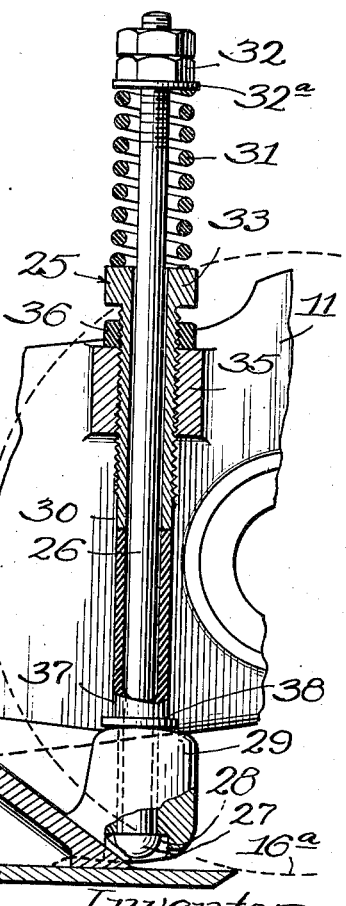
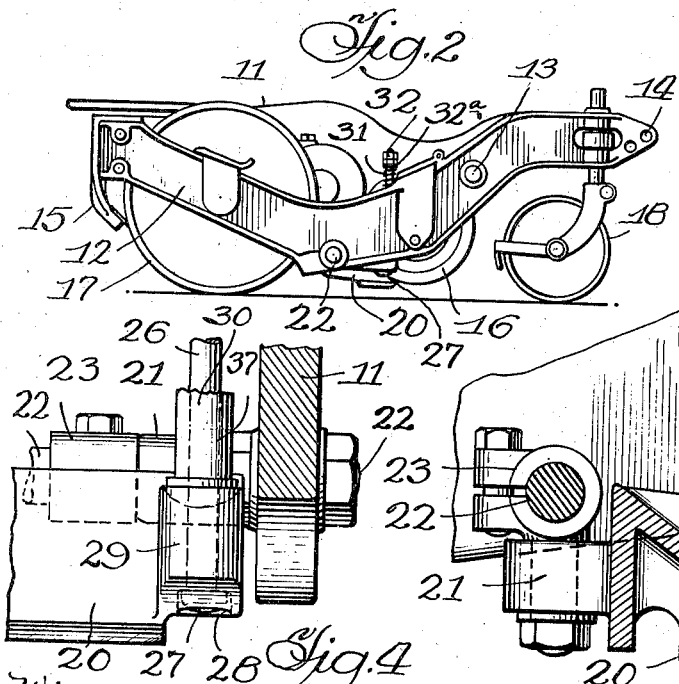
Inventor,
Joseph A. Roseman Patented Aug. 9, 1938

2,126,139

UNITED STATES PATENT OFFICE 2,126,139

BED KNIFE ADJUSTMENT FOR MOWING MACHINES

Joseph A. Roseman, Glenview, Ill.

Application February 18, 1937, Serial No. 126,341

5 Claims. (Cl. 56—294)

This invention relates to improvements in mowing machines of the cutter reel type especially designed for use in multiple gang mowers, and more particularly to the bed plate adjustment for machines of the character described.

As heretofore constructed, mowing machines have been provided with various arrangements for adjusting and holding the bed plate in proper cutting position relative to the cutter reel, and yet permitting limited yielding movement of said bed plate when the cutter reel strikes relatively large solid objects such as roots, spikes, branches or similar obstructions that are difficult or impossible to be cut and are therefore likely to damage the machine unless the bed plate has some yielding movement.

One adjustment device in common use includes a one-way tension device acting to urge the bed plate toward the cutter blade, but this is not entirely satisfactory because of the resulting pressure or drag on the reel, and also the danger from an accidental upward blow on the bed plate which may be sufficient to break or seriously damage the cutter reel. In another arrangement, the position of the bed plate is controlled by two opposed tension devices which are adjusted to hold the bed plate in its cutting position, and affording yielding movement in both directions. This arrangement while somewhat more complicated and difficult of adjustment, tends to eliminate continuous drag on the reel if properly adjusted, yet there is still the danger of damage from an accidental upward blow on the bed plate previously referred to.

In carrying out my invention, I provide an improved and simple adjustment for the bed plate in which the desirable yielding movement is permitted in a direction away from the cutter reel, but in which said bed plate is urged toward a positive stop means readily adjustable to the proper cutting position. The bed plate may thus yield downwardly to permit smaller solid objects to pass between the reel and bed plate without injury to the machine, and relieve the shock produced when larger obstructions strike the bed plate.

As a further feature of my invention, the improved adjustment devices are readily accessible from the top of the side frames, as will hereinafter more fully appear.

The invention may best be understood by reference to the accompanying drawing, in which Fig. 1 is a plan view of a mower unit embodying the invention.

Fig. 2 is a side view of the unit shown in Fig. 1.

Fig. 3 is an enlarged fragmentary detail view of one of the adjusting devices taken on line 3—3 of Fig. 1, with parts broken away.

Fig. 4 is a fragmentary detail front view of the adjusting device shown in Fig. 3.

Referring now to details of the embodiment of the invention shown in the drawing, a mower unit is indicated generally at 10, and includes side frame members 11 and 12, front cross braces 13 and 14, and a rear cross brace 15. A cutter reel 16 is rotatably mounted transversely of the side frames, and is driven in the usual manner from a traction roller 17 by gearing (not shown) in the side frame 11. The traction roller 17 extends substantially the full length of the reel 16 and is relatively heavy so as to keep the mower unit securely on the ground. The front end of the unit is supported on two caster wheels 18 mounted adjacent the front ends of the side frames 11 and 12.

The bed plate is indicated at 20 and extends the length of the cutter reel in the usual horizontal position adjacent the ground. Said bed plate has rearwardly projecting brackets 21 pivotally mounted on a cross-bar 22 extending between and fixed to the side frames. The position of the bed plate is adjusted longitudinally of the cross-bar 22 by split collars 23, 23.

Referring now to the adjusting means associated with the bed plate, duplicate adjustment devices indicated generally at 25, 25 are provided for opposite ends thereof, so that a description of one such device will serve for an understanding of both. As shown in detail in Figs. 3 and 4, each adjusting device includes an upright rod or bolt 26 having a head 27 at its lower end seated in a socket 28 formed in a forwardly projecting arm 29 at the end of the bed plate. Said bolt passes upwardly through a sleeve 30 and extends beyond the upper end of the latter where it has a coil expansion spring 31 interposed between a nut 32 and washer 32ᵃ and the octagonal head 33 of said sleeve. The sleeve is threaded in a boss 35 formed integral with the side frame 11 adjacent its upper margin as shown. A lock nut 36 is on the sleeve 30 below the head 33 thereof, so as to be screwed down against the top of the boss 35 and hold said sleeve in any desired position of vertical adjustment. A collar 37 having an enlarged end 38 is preferably interposed between the lower end of the sleeve 30 and the arm 29 of the bed plate, to afford substantial bearing engagement with the latter.

With the arrangement above described, it will be understood that the coil spring 31 normally urges the rod 26 to hold the arm 29 against the fixed stop provided by the sleeve 30 and collar 37. The bed plate 20, rigid with arm 29, is thus held under tension against a fixed stop which is adjustable so that the proper cutting position of said bed plate relative to the periphery 16ª of the cutter reel can be precisely controlled, and yet the bed plate is readily yieldable in a downward direction to protect the parts from damage by solid obstructions, etc., that are frequently encountered while cutting.

The necessary adjustments can be effected by a wrench applied to the head 33 and lock nut 36, both in accessible position at the upper edge of the side plates, and the tension of the coil spring 31 is likewise readily adjusted by nut 32 at the upper end of the bolt 26.

As a further advantage of my invention, it will be understood that while in use the bed plate is constantly rocking more or less on the cross-bar 22, so as to keep its pivotal bearings 21, 21 free of rust and dirt which otherwise might tend to "freeze" the bed plate in place and destroy the proper operation of the device.

Although I have shown and described one particular embodiment of my invention, it will be understood that I do not wish to be limited to the exact construction shown and described, but that various changes and modifications may be made without departing from the spirit and scope of my invention as defined in the appended claims.

I claim as my invention:

1. In a mowing machine, a frame including two side plates, a cutter reel rotatably mounted on and extending between said side plates, a bed plate co-operating with said cutter reel adjacent the bottom thereof, and adjusting devices for opposite ends of said bed plate, each of said devices comprising a positive stop member abutting said bed plate and adjustable with respect to said frame, and a yieldable connection including an expansion spring disposed above said stop member and normally urging said bed plate against said stop but permitting limited movement of said bed plate radially of said cutter reel.

2. In a mowing machine having a frame, a rotatable cutter reel mounted thereon, a bed plate, and an adjustment for said bed plate including a sleeve having means for adjustment longitudinally relative to said frame and affording a fixed stop to determine the cutting position of said bed plate relative to said cutter reel, a rod passing through said sleeve, having one end connected to said bed plate and the other end provided with an expansion spring disposed above said sleeve adjustment means normally urging said bed plate towards said sleeve, but permitting yielding movement of said bed plate radially of said cutter reel.

3. In a mowing machine having a frame, a rotatable cutter reel mounted thereon, a bed plate and an adjustment for said bed plate including a sleeve adjustable longitudinally relative to said frame and according a fixed stop to determine the cutting position of said bed plate relative to said cutter reel, a rod passing through said sleeve, having its lower end connected to said bed plate and its upper end provided with an expansion spring normally urging said bed plate towards said sleeve, but permitting yielding movement of said bed plate radially of said cutter reel, and means for adjusting said sleeve disposed in accessible position adjacent the top of said frame.

4. In a mowing machine, a frame including two side plates, a cutter reel rotatably mounted on and extending between said side plates, a bed plate co-operating with said cutter reel adjacent the bottom thereof and an adjustment for said bed plate including an upright sleeve adjustable longitudinally relative to one of said side plates and affording a fixed stop to determine the cuting position of said bed plate relative to said cutter reel, a rod passing through said sleeve having its lower end connected to said bed plate and its upper end provided with an expansion spring normally urging said bed plate toward said sleeve, but permitting yielding movement of said bed plate away from said sleeve, and means for adjusting said sleeve relative to its respective side plate, said adjusting means being disposed in accessible position adjacent the top of said side plate.

5. In a mowing machine, a frame including two side plates, a bed plate co-operating with said cutter reel adjacent the bottom thereof and adjacent devices for opposite ends of said bed plate, each of said devices comprising an elongated sleeve disposed vertically of its respective side plate and threaded for vertical longitudinal adjustment with respect thereto so as to form a fixed stop adjustable to determine the cutting relation of said bed plate relative to said cutter reel, a rod passing through said sleeve having its lower end connected to said bed plate and its upper end extending beyond said sleeve and provided with an expansion spring normally urging said bed plate toward said sleeve but permitting yielding movement of said bed plate radially of said cutter reel, said sleeve having a head at its upper end disposed adjacent the upper margin of its respective side plate so as to be readily accessible for adjustment.

JOSEPH A. ROSEMAN.